Figure 1:
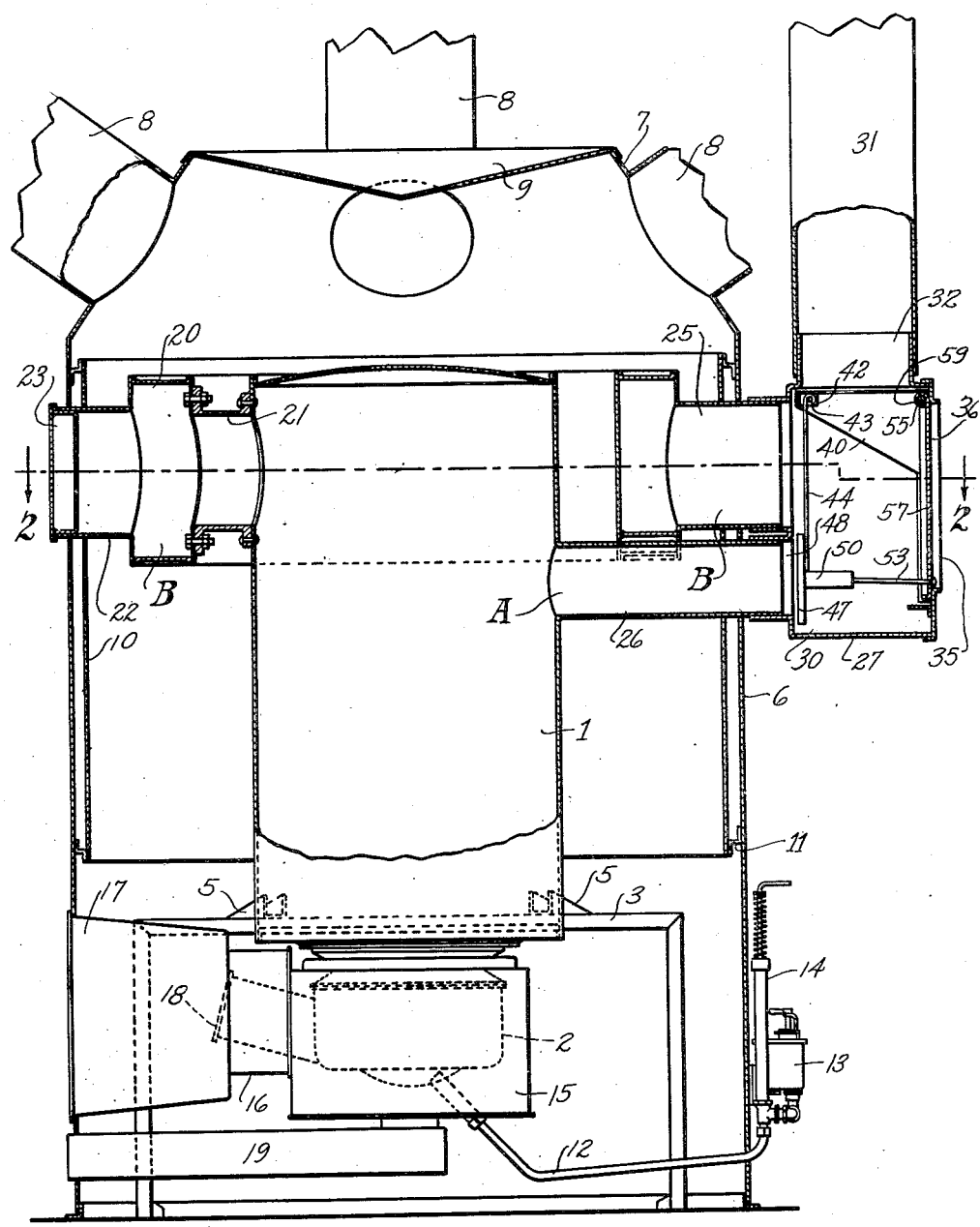

Nov. 6, 1934.  L. S. CHADWICK ET AL  1,979,865
DRAFT REGULATOR
Filed May 31, 1932    8 Sheets-Sheet 1

Inventors
Lee S. Chadwick
John H. Dahlstrom
By Hull, Brock & West
Attorneys

Nov. 6, 1934.　　　L. S. CHADWICK ET AL　　　1,979,865
DRAFT REGULATOR
Filed May 31, 1932　　　8 Sheets-Sheet 2
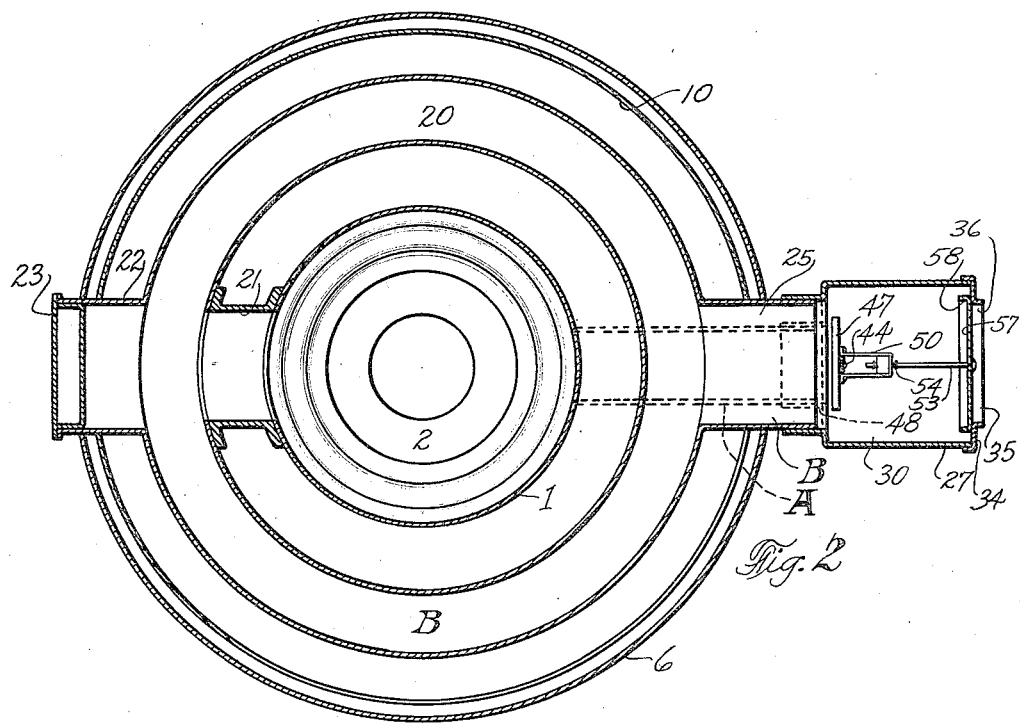
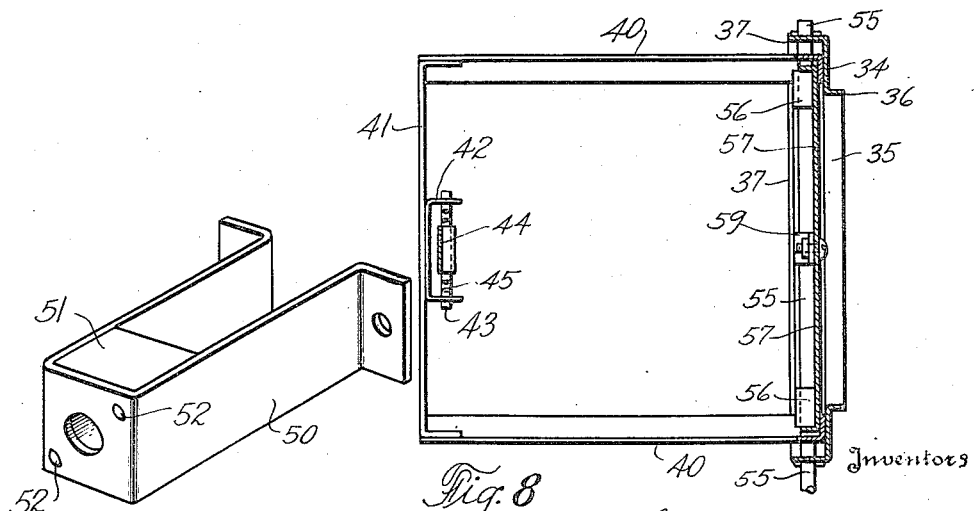

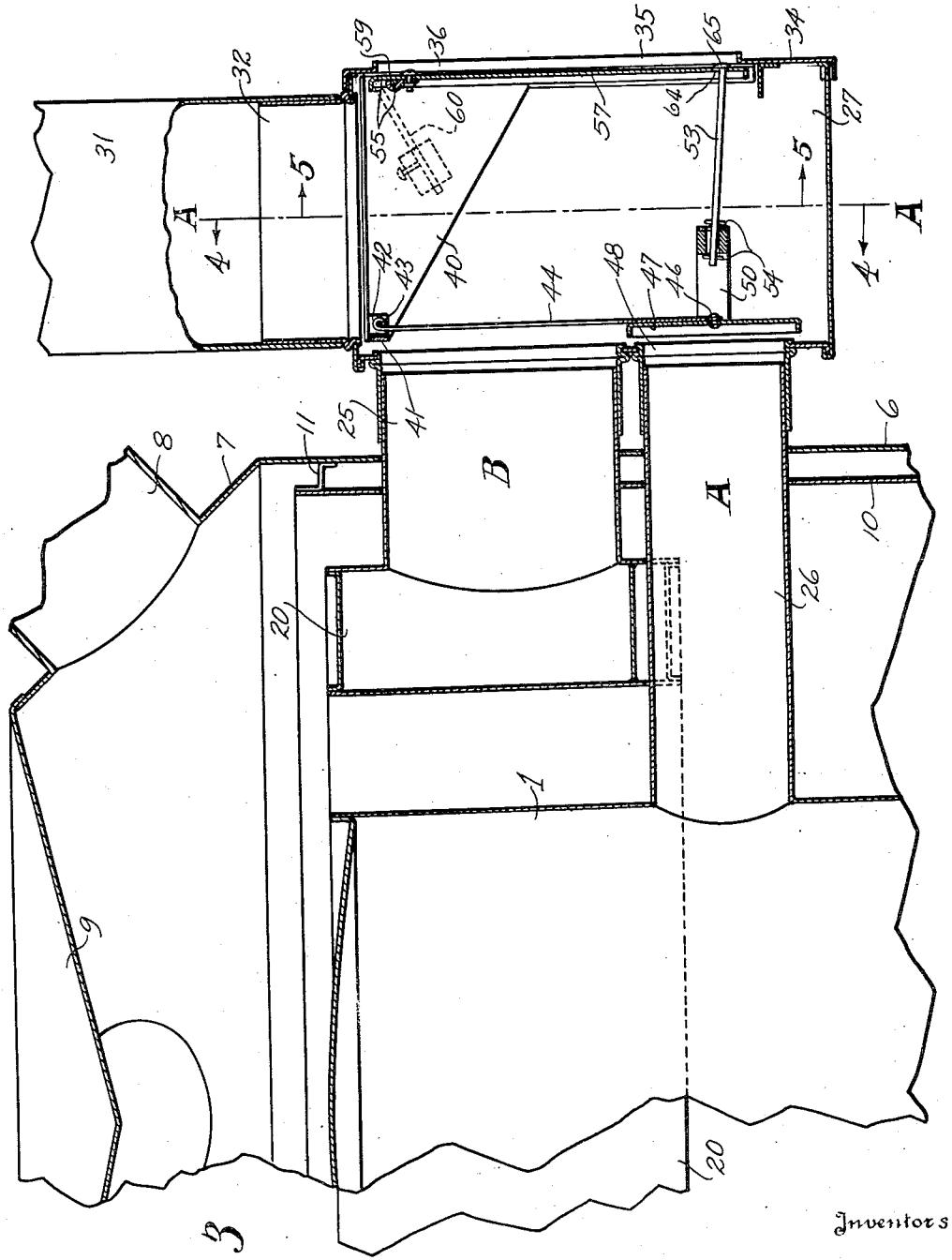

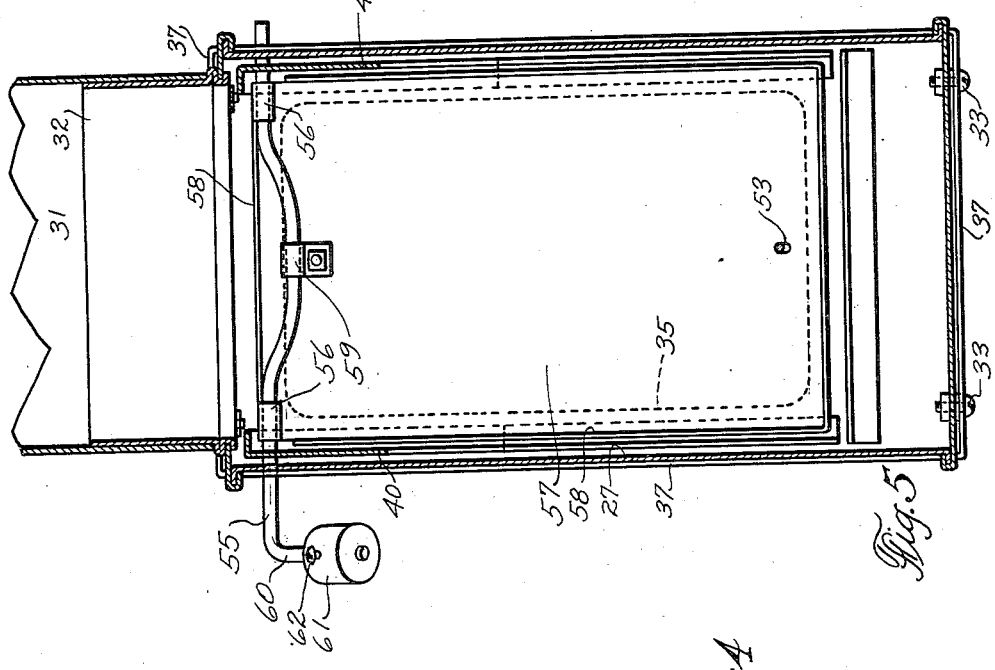
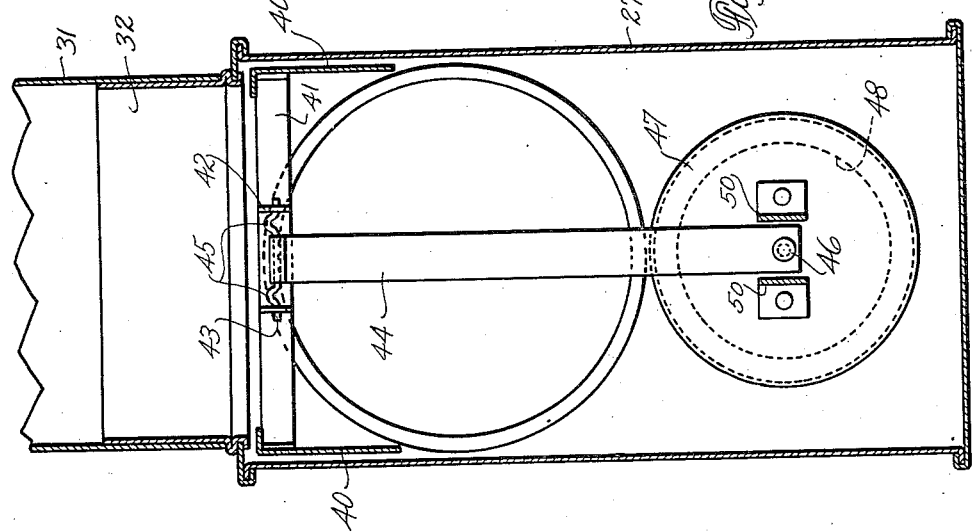

Nov. 6, 1934.  L. S. CHADWICK ET AL  1,979,865
DRAFT REGULATOR
Filed May 31, 1932  8 Sheets-Sheet 5
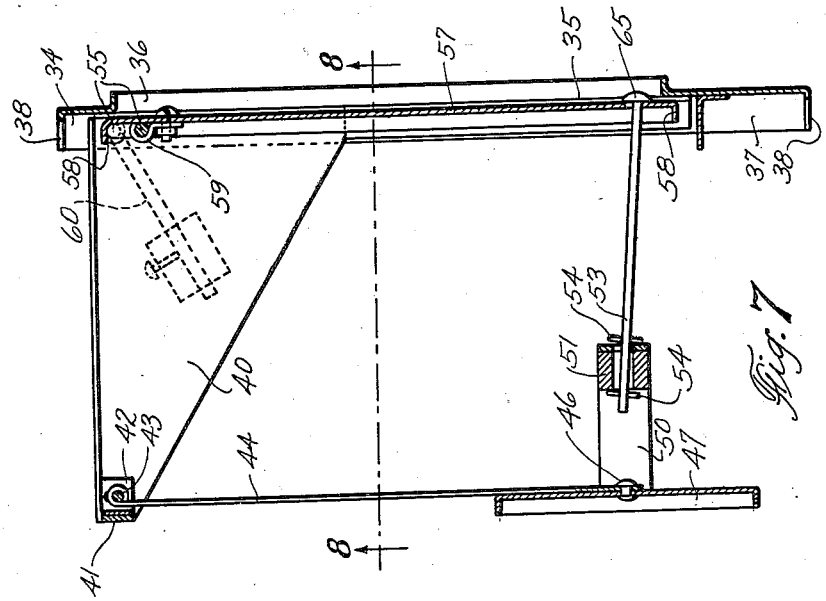
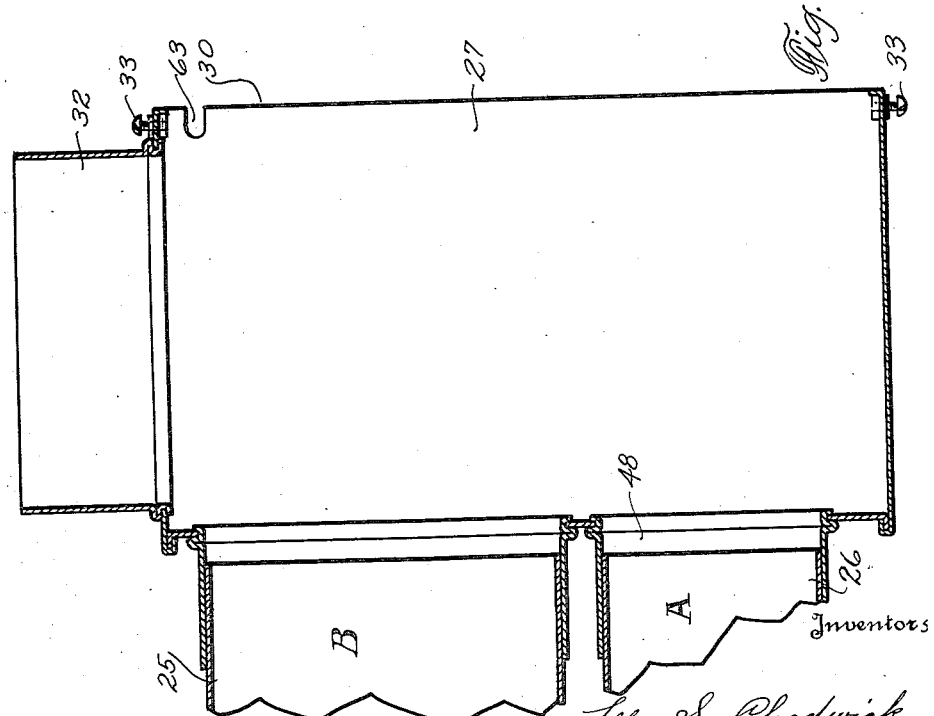

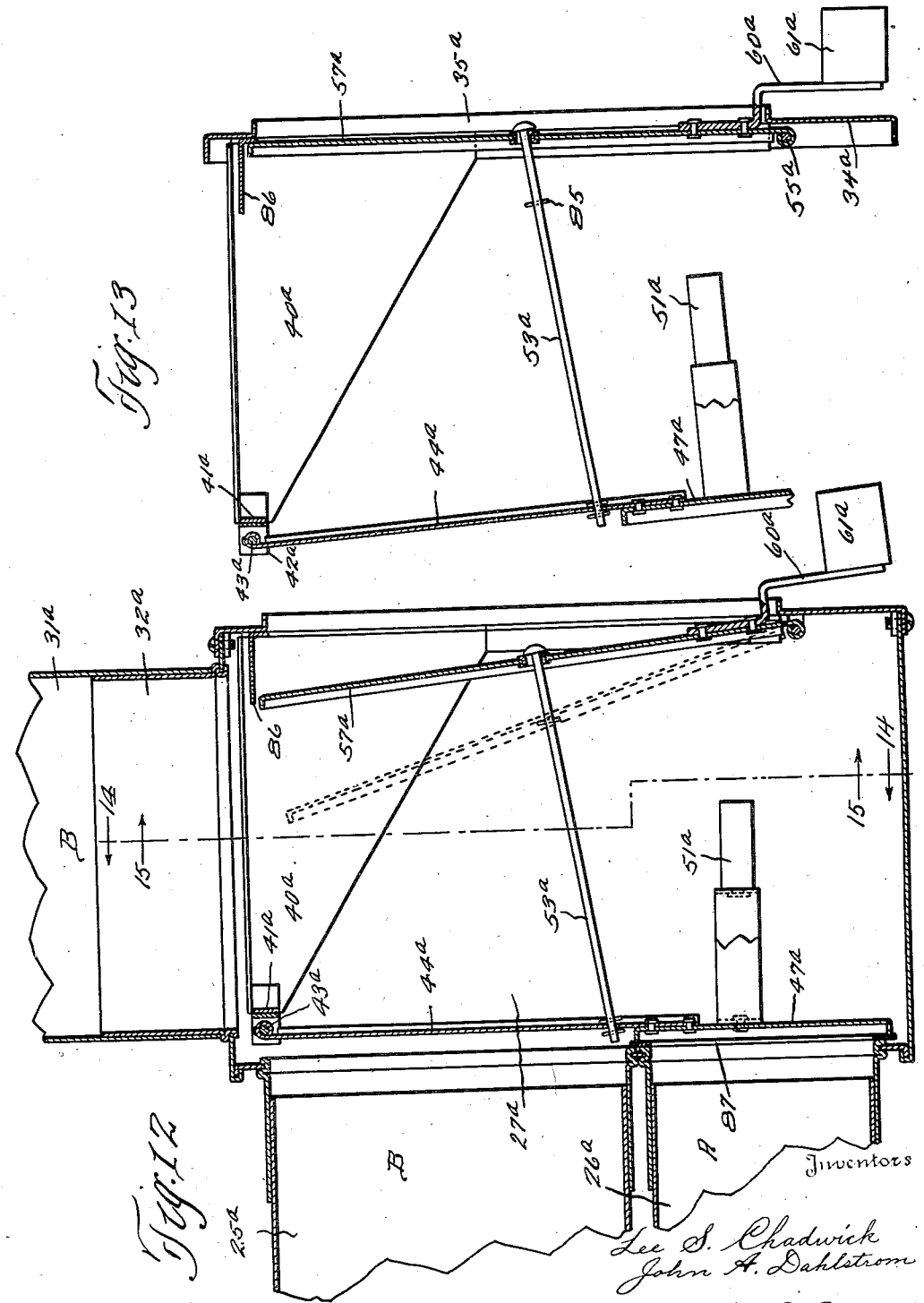

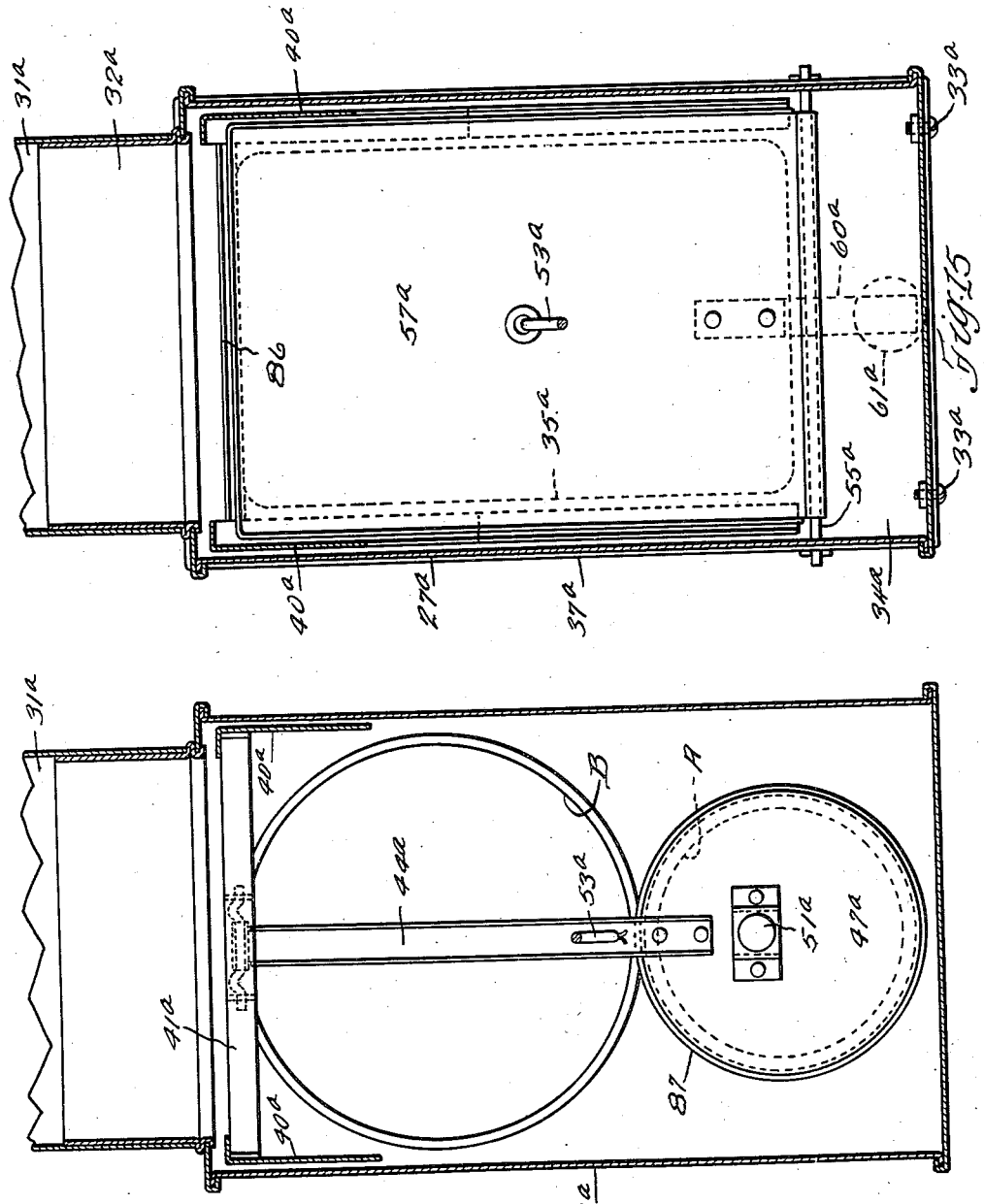

Patented Nov. 6, 1934

1,979,865

UNITED STATES PATENT OFFICE 1,979,865

DRAFT REGULATOR

Lee S. Chadwick, Shaker Heights, and John Alger Dahlstrom, Bay Village, Ohio, assignors to Perfection Stove Company, Cleveland, Ohio, a corporation of Ohio Application May 31, 1932, Serial No. 614,496

19 Claims. (Cl. 126—285)

This invention pertains to natural draft furnaces and to draft regulators for use with such furnaces and other similar combustion apparatus. The class of natural draft furnaces to which the invention more especially relates is that in which there are an indirect passageway (known as a radiator in the case of hot-air furnaces), and a direct passageway (or so-called by-pass), both of which serve to conduct the products of combustion from the combustion chamber to the flue; and the invention in its more complete aspect has to do with an automatic combined draft regulator and by-pass control for furnaces of the aforesaid character, especially those of the oil burning variety where efficiency and fuel economy are items of more than ordinary consideration.

As is well known, the purpose of the indirect passageway is to obtain the maximum number of heat units from the products of combustion before the latter escape to the flue, while that of the direct passageway is to reduce to a minimum obstruction to, or interference with, the passage of the products to the flue at the time the fire is started and is getting under way provided there is insufficient flue draft at the time to draw the products through the indirect passageway.

In considering the invention, it may be well to bear in mind that the amount of flue draft is dependent on two factors, namely: the temperature of the flue, and outside air conditions. An ideal flue draft is one which will draw just enough air into and through the combustion chamber and the indirect passageway or radiator to effect as nearly as possible complete combustion. If the draft is not strong enough to accomplish this, the furnace will be inefficient because combustion will be poor and consequently a great deal of soot will be formed and deposited on the inner sides of the heat radiating walls and only a low percentage of the heat units in the fuel will be expended to a useful purpose. If, on the other hand, the flue draft is too strong, the furnace will again prove inefficient because a great part of the heat will be drawn up the flue.

In the case of furnaces of the class to which the present invention relates—that is to say, those having the direct and indirect passageways—it is desirable to maintain just enough of a flue draft to pull the products of combustion through the indirect passageway at a velocity that will permit them to give off the maximum of their heat units and draw the required amount of atmospheric air into the combustion chamber to support as nearly as possible complete combustion. Such a flue draft may result from outside air conditions, as is well known to those familiar with the subject. If such a condition invariably prevailed at the time a fire was started, there would be no purpose in the direct passageway or by-pass. It is to take care of instances of starting where such a condition does not exist that the direct passageway or by-pass is employed; and ordinarily there is no appreciable upward draft in a flue at the time the fire is started.

On the occasion of starting a fire, when the action of the flue is sluggish, the products, taking the course of least resistance, pass from the combustion chamber to the flue through the direct passageway or by-pass. As the air in the flue becomes heated it will rise and the flue draft will thus increase and in a comparatively short while the draft will be of sufficient force to pull the products through the indirect passageway. It is clear from what has been said that it is desirable to shut off the direct passageway or by-pass after the fire is well under way as otherwise there would be a considerable loss of efficiency by reason of the tendency of the products to escape through the direct passageway or by-pass to the flue instead of taking the more tortuous course through the indirect passageway or radiator.

Broadly stated, our invention may be said to have as its primary purpose the provision of means that acts automatically under the influence of the suction of the flue for regulating the draft through the combustion chamber and the indirect passageway to compensate for any variations in the flue draft, and permitting direct escape of the products from the combustion chamber to the flue during the incipient stages of combustion or when the suction of the flue is below that prevailing under normal operating conditions.

More limitedly, it is a purpose of our invention to provide means that acts automatically to close the direct passageway or by-pass when normal operating conditions are attained.

A still more specific object of our invention is to provide means responsive to the suction of the flue for regulating the draft through the combustion chamber and indirect passageway or radiator to compensate for variations in the flue draft and for closing the direct passageway when the suction of the flue is less than that required to satisfactorily pull the products through the indirect passageway.

Another object of the invention is to provide a draft regulator and by-pass control in which two valves or dampers are employed, one for controlling the by-pass, and the other the admission of atmospheric air to the flue when the suction of the flue exceeds that necessary to draw the required amount of air into the combustion chamber and pull the products through the indirect passageway or radiator, and which valves or dampers are operatively connected in such manner as to cause the by-pass valve or damper to be held open when the air admitting valve or damper is closed, and which will effect the closing of the former valve or damper when the air valve or damper is opened to any appreciable extent.

A still further and more specific object is to provide a construction for a draft regulator and by-pass control consisting of an open-sided casing that is adapted to have communicative connection with the combustion chamber of a furnace or the like through the direct and indirect passageways of the latter, and is adapted also to have connection with the flue, together with an assembly for detachable connection with said casing, such assembly comprising a frame arranged to extend across the open side of the casing and from which are supported a damper or valve for controlling the direct passageway or by-pass, a damper or valve for the opening of the frame, means tending to maintain the latter damper or valve closed, and operative connections between the dampers or valves whereby the first mentioned one is held open when the second is closed.

Other objects are to provide a simple and inexpensive yet thoroughly reliable draft regulator and by-pass control that is preferably constructed in most part of sheet metal and in such manner as to expedite manufacture and facilitate assembly and disassembly, afford ready access to all parts, and permit of convenient adjustment to adapt the device to different and varying conditions.

Figures 10, 11:
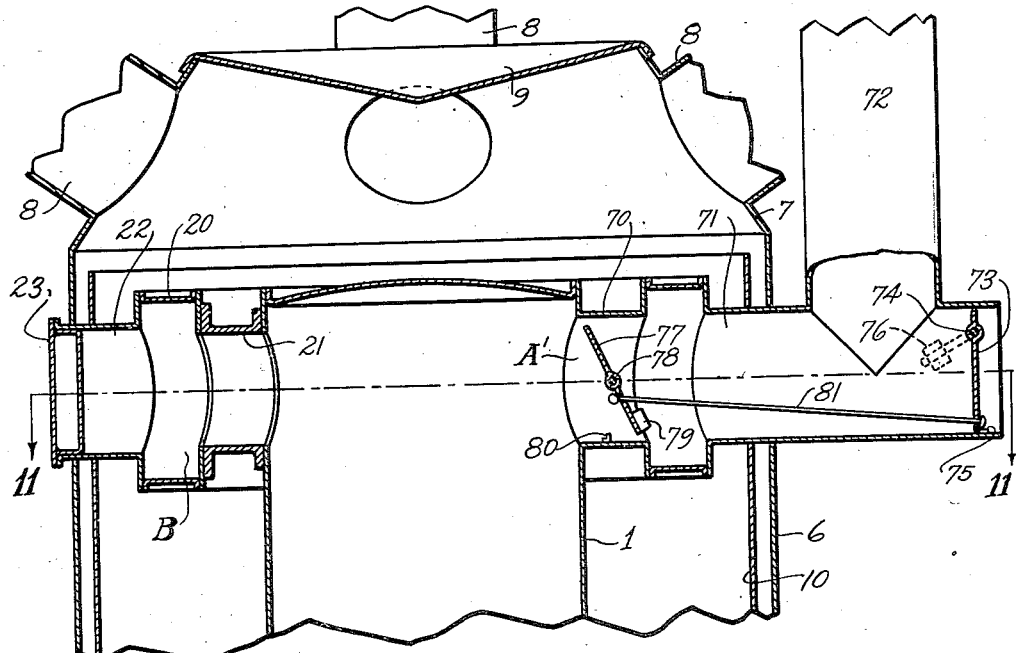

Further objects and advantages will appear as we proceed to describe the invention in detail by reference to the accompanying drawings wherein Fig. 1 is a sectional side elevation of a furnace incorporating the invention; Fig. 2 is a sectional plan on the line 2—2 of Fig. 1; Fig. 3 is an enlarged vertical section through the draft regulator and by-pass control and the adjacent parts of the furnace; Figs. 4 and 5 are transverse vertical sections through the draft regulator and by-pass control on the line A—A of Fig. 3, the respective views being taken as though looking in the direction of the correspondingly numbered arrows associated with said line, the present figures being on a further enlarged scale; Fig. 6 is a central vertical section through the casing of the regulator and by-pass control; Fig. 7 is a similar view of the assembly that is adapted to be detachably connected to the casing of Fig. 6; Fig. 8 is a horizontal section on the line 8—8 of Fig. 7, looking upwardly as indicated by the arrows associated with said line; Fig. 9 is a detail in perspective of the weight arm carried by the valve or damper for controlling the direct passageway or by-pass; Fig. 10 is a fragmentary sectional side elevation of a furnace embodying a modification of the invention; Fig. 11 is a sectional plan on the line 11—11 of Fig. 10; Fig. 12 is a vertical section through a modified form of a draft regulator and by-pass control; Fig. 13 is a detail thereof showing the parts in a different position, and Figs. 14 and 15 are sections on the line B—B of Fig. 12 looking in the direction of the arrows 14, 14 and 15, 15, respectively.

The invention is illustrated in connection with an oil burning hot-air furnace because it is peculiarly suited to a combustion device or apparatus of this character, although we desire it to be understood that the invention is not limited to such an association. The reasons why the invention is of peculiar value in connection with an oil burner will be obvious to those skilled in the art. For example, an oil burner is quite sensitive to drafts and the drafts have to be controlled quite accurately if the burner is to operate satisfactorily and efficiently; and care must be exercised to conserve the heat units and obtain the maximum efficiency from them in the interest of economy. Furthermore, unless the draft is such as to effect as nearly as possible complete combustion, parts of the burner, and the walls of the combustion chamber and passageways become laden with carbon deposits which materially reduce the effectiveness of the apparatus.

The furnace herein shown comprises a combustion chamber 1, a burner that is designated generally by the reference numeral 2, a frame 3 by which the combustion chamber is supported through means of brackets 5, and a jacket 6 that incloses the foregoing parts. Following common practice, this jacket is of sheet metal, such as galvanized iron, and it includes the usual upwardly tapering wall 7 from which the heat distributing pipes 8 extend, and which is surmounted by the shallow, inverted conical top 9. Throughout approximately the vertical extent of the combustion chamber 1, the jacket 6 has a liner 10 that is supported, and spaced from the jacket, by members 11.

The burner 2 is of the same type as that disclosed in co-pending application Serial No. 488,210, filed October 13, 1930. The burner is supplied with oil from a suitable source through a supply line of which the conduit designated 12 is a part and the same includes a metering valve and liquid level control device 13 which may be of any approved construction. 14 refers generally to a clean-out means for the fuel line which is similar to that disclosed in co-pending application Serial No. 597,168, filed March 7, 1932. The burner 2 is housed within a drum 15 that connects, through a sleeve 16, with a casing 17 that opens through the front of the jacket 6 and provides access to the lighting and clean-out opening of the burner that is indicated at 18. Air is supplied to the burner through a duct 19 that opens through the front of the jacket 6 below the casing 17.

Surrounding and spaced radially from the top portion of the combustion chamber 1 is an annular radiator 20 which encloses a part of the indirect passageway hereinbefore referred to. The radiator communicates with the combustion chamber adjacent the front of the structure through a duct 21, in alignment with which a tubular extension 22 projects forwardly from the radiator through aligned openings in the jacket 6 and lining 10 and whose front end is normally closed by a removable plug 23. This arrangement allows access to the top portion of the combustion chamber, the duct 21 and the adjacent portion of the radiator, for cleaning purposes. Projecting from the rear side of the radiator 20 is a tubular outlet extension 25 that passes through aligned openings in the lining 10 and jacket 6. Arranged immediately below the extension 25, and having its outer end terminating in the vertical plane of the corresponding end of said extension, is a duct 26 that leads from the combustion chamber and provides what has hereinbefore been referred to as the direct passageway or by-pass. The latter is designated A, while the indirect passageway, provided by the duct 21, radiator 20, and outlet extension 25, is designated B.

Applied to the rear ends of the extension 25 and duct 26 are collars that project forwardly from the front wall of a casing 27 that constitutes a part of our automatic draft regulator and by-pass control designated generally by the reference numeral 30. The casing 27 is open at the rear, as best shown in Fig. 6, and its upper end has communicative connection with a flue 31 through a collar 32.

Detachably connected to the rear open side of the casing 27, by screws 33, is a frame 34, having an opening designated 35 that is surrounded by a flange 36. The frame 34 has a peripheral flange 37 that telescopes over the rear marginal portion of the casing 27, and the same is notched at 38 for the reception of the shanks of the screws 33. Extending inwardly from the opposite sides of the frame 34, adjacent its upper end, are brackets 40 whose inner ends are tied together by a cross bar 41. As best shown in Figs. 4 and 8, a U-shaped member 42 is carried by said cross bar and within the parallel end branches of which are supported the ends of a shaft 43 about the central portion of which is engaged a sleeve-like bearing that is formed by the curled over upper end of a metal strap 44. The shaft 43 is prevented from moving endwise, and the aforesaid bearing sleeve is maintained central of the shaft, by kinks 45 that are formed in the shaft between said bearing and the opposed ends of the member 42. Fastened to the lower end of the strap 44, as by a rivet 46, is a circular valve or damper 47 that is arranged for cooperation with the opening 48 of the casing 27 through which the direct passageway or by-pass A communicates with the interior of said casing. Connected to and extending rearwardly from the valve or damper 47 is an arm 50 that carries, at its outer end, a weight 51. This arm is constructed of strap metal and is U-shaped in plan, as best disclosed in Figs. 2 and 9. The weight, and the central portion of the U-shaped arm to which the weight is attached, as by fastening means designated 52, are provided with registering openings through which the inner end of a rod 53 loosely extends. The rod is restrained against appreciable longitudinal movement with respect to the arm and weight by stops 54 which may consist of cotter pins engaged through holes in the rod.

A shaft 55 is supported for oscillation within bearing apertures formed in opposed parts of the flange 37 near the upper end of the frame 34 and in adjacent parts of the brackets 40; and surrounding the portions of the shaft immediately inwardly of the brackets 40 are sleeves 56 that are formed integral with and at the upper corners of a rectangular valve or shutter 57 that cooperates with the opening 35 of the frame 34. Said valve or shutter is preferably constructed of sheet metal, and to impart stiffness thereto it is flanged along its top, bottom and side edges, as indicated at 58. Between the sleeves 56, the shaft 55 is bowed downwardly and the low part of said shaft is fastened to the valve or shutter 57 by a clip 59. This provides a simple means of fastening the valve or shutter to the shaft so that it is incapable of oscillation independently of the shaft. One end of the shaft 55 is turned laterally to provide an arm 60 along which a weight 61 is adjustable, the weight being held in any position of adjustment by a set screw 62. It is clear that under the influence of said weight the valve or shutter 57 is biased toward closed position. The side walls of the casing 27 are notched adjacent their upper rear corners to accommodate the shaft 55, one of the notches being shown at 63 in Fig. 6. The outer end of the previously mentioned rod 53 extends loosely through an opening 64 in the valve or shutter 57, beyond which said rod is provided with a head or abutment 65, this construction effecting a lost-motion connection between the shutter 57 and the damper 47. The proportions are such that when said valve or shutter is in closed position—that is, in a position to close the opening 35—the valve or damper 47 will be sustained in open position—in spaced relation to the front wall of the casing 27 so as to leave the opening 48 uncovered—through the operative connections comprising the rod 53 and the arm 50. As the valve or shutter 57 is swung inwardly in opposition to the weight 61, under conditions hereinafter to be described, it will permit the valve or damper 47 to close under the influence of the weight 51.

It is evident from the foregoing description that our invention provides a simple and reliable draft regulator which is compact, readily adjustable to different conditions, as will hereinafter more fully appear, and, according to the form already described, is especially convenient of assembly and disassembly, it being remembered that all operating parts are carried by the frame 34, and are removable therewith from the casing 27. In attaching said frame to the casing, or in detaching it therefrom, it is only necessary to loosen or tighten the screws 33.

Before the fire is started the flue is cold, and unless outside air conditions are such as will cause an upward flow of air in the flue, there will be very little if any flue draft. Under these conditions the valve or shutter 57 is held closed by the weight 61, and the same, in turn, holds the valve or damper 47 open through the intervention of the rod 53 and arm 50. When the fire is started, the products will escape through the direct passageway or by-pass A—that being the line of least resistance—to the flue. As the flue warms up, the draft will increase and in consequence of the suction exerted upon the inner side of the shutter or valve 57, or, more accurately, in response to the atmospheric pressure imposed upon its outer side, said valve or shutter will open, allowing the valve or damper 47 to close and shut off the direct passageway or by-pass A. The products will then be drawn through the indirect passageway B or, in other words, through the radiator 20 and through the relatively large outlet of the radiator into the casing 27 and up the flue. By reason of this additional heat, the flue draft will increase and the valve or shutter 57 will open further in response thereto independently of the valve or damper 47 because of the lost-motion connection between them and admit sufficient atmospheric air to satisfy the force of such draft in excess of that required to draw the products through the indirect passageway or radiator at the desired speed, and sufficient air into the burner to promote proper combustion. The admission of the cool atmospheric air to the flue will lower the temperature of the gases rising therein which will reduce the draft, and this decrease in suction will be compensated for by a swinging of the valve or shutter 57 toward closed position.

If, at the time the fire is started and the flue is cool, there happens to be a heavy suction in the flue due to outside air conditions, the valve or shutter 57 will open in response thereto and the valve or damper 47 of the by-pass will close, and obviously under these conditions all the products of combustion will be immediately pulled through the indirect passageway or radiator. It will be seen, therefore, that our invention provides a draft regulator that operates automatically to control the suction on the combustion apparatus caused by the flue draft whether such draft be induced by temperature of the gases within the flue or by outside air conditions.

The construction and mode of operation of the modification of the invention illustrated in Figs. 10 and 11 will be readily understood in view of the foregoing discussion of the more elaborate embodiment. Here the direct passageway, designated A', is provided by the relatively short duct 70 that connects the rear side of the combustion chamber 1, in the zone of the radiator 20, with the adjacent portion of said radiator, such duct being in alignment with the radiator outlet 71 that connects with the flue 72, and, projecting beyond said flue, serves as an inlet for atmospheric air. Such inlet is controlled by a valve or damper 73, mounted on a shaft 74, and biased toward closed position, in which it contacts with stop 75, by a weight 76 that is mounted on the laterally turned end of the shaft. The by-pass A' is controlled by a valve or damper 77, mounted on the cross shaft 78 in the duct 70. This valve or damper is swung by a weight 79 toward closed position, in which position its lower edge contacts with a stop 80. A rod 81 connects the valves or dampers 73 and 77, and is of such length as will cause the latter valve or damper to be held open when the former is closed.

During the incipient stages of combustion, before the flue has become heated, and in the event an upward draft is not induced therein by outside air conditions, the products will escape from the combustion chamber to the flue directly through the by-pass A'. As operating conditions become normal, due to flue suction, the valve or damper 73 will be swung open more or less, thereby to permit the valve or damper 77 to close, and thereafter the products will pass to the flue through the indirect passageway provided by the duct 21, radiator 20 and duct 71.

The modification of the invention illustrated in Figs. 12 to 15 is quite similar to the first described form, for which reason we shall use the same reference numerals to designate the corresponding parts of the two embodiments, those applied to the later form being augmented by the exponent $a$. The essential structural difference between the two embodiments just referred to resides in the manner of mounting the main damper. In the modification now under consideration, the main damper $57^a$ is hingedly supported adjacent the bottom of the opening $35^a$ which it controls. As in the former case, this damper is constructed of a sheet of metal, and as shown in Figs. 12, 13 and 15, the lower edge of the metal sheet is curled about a shaft or pintle $55^a$ that is supported as by having its ends engaged through holes in the flange $37^a$ of the frame $34^a$. A weight $61^a$, that is connected through a strap $60^a$ to the damper $57^a$, tends to retain the damper in closed position, and the weight may be adjusted with respect to the damper by bending the strap $60^a$.

The by-pass valve or damper $47^a$ is suspended through a strap $44^a$—that is made rigid by flanging its lateral edges—from a relatively short shaft $43^a$, supported by a member $42^a$ on the cross bar $41^a$ that connects the inner ends of the brackets $40^a$. The valves or dampers $57^a$ and $47^a$ are operatively connected together by means of the rod $53^a$. The inner end of said rod is attached to the strap $44^a$ as by having said end projected through an opening in the strap and pins inserted through holes in the rod on opposite sides of the strap. The outer end of the rod is engaged through an eyeleted opening in the valve or damper $57^a$ beyond which the rod is equipped with a head. A stop 85 is carried by the rod $53^a$ a suitable distance inwardly of the aforesaid head for arresting the inward movement of the damper $57^a$, as will presently appear.

A shield or baffle 86 is carried by and projects inwardly from the frame $34^a$ above the opening $35^a$, the purpose of which will be understood from the description of the operation of this form of the invention which will follow. The valve or damper $47^a$ that controls the by-pass A has connected to it a weight $51^a$ which tends to move the valve toward closed position. A washer or gasket 87, of asbestos or the like, surrounds the discharge end of the by-pass and is arranged to be engaged by a peripheral flange of the valve or damper $47^a$.

When no appreciable flue draft exists, as when the combustion device or furnace is not in operation and outside air conditions are not such as to induce an upward draft through the flue, the valves or dampers are in the positions illustrated in Fig. 13. That is to say, the main valve or damper $57^a$ is held closed by the weight $61^a$, and the by-pass valve or damper $47^a$ is maintained open by reason of its connections with the former valve or damper through the rod $53^a$. Now, if a fire is started, the products will take the course of least resistance through the by-pass A and through the casing $27^a$ to the flue $31^a$, and as the air in the flue becomes heated and rises and an upward draft is thus created it will tend to suck the valve or damper $57^a$ inwardly. As said valve or damper swings inwardly, the by-pass valve or damper $47^a$ will move toward closed position and will assume such position, in contact with the washer or gasket 87, as the upper edge of the main valve or damper reaches a position adjacent the inner edge of the shield or baffle 86. During this swinging of the main valve or damper, very little air is admitted through the opening $35^a$ because of the presence of the shield or baffle 86 and the fact that the sides of the valve or damper are contiguous to the sides of the casing $27^a$. The by-pass now being closed, the flue draft will exert a pull on the indirect passageway B which will cause the products of combustion to travel through the radiator. At this point it may be explained that the flue draft (as it prevails at the time the main valve or damper is in full line position shown in Fig. 12, when its upper edge is adjacent the inner edge of the shield or baffle 86) is approximately right in amount or value to draw the products through the indirect passageway or radiator at the speed or velocity that will insure the maximum of efficiency or most desirable results. When the flue draft increases beyond this amount, the main valve or damper will swing open further to supply outside air to satisfy the excess draft, and at the same time said valve or damper, swinging inwardly across the opening of the flue, will throttle the passageway through which the flue communicates with the indirect passageway B. Consequently after the combustion apparatus or furnace is in normal operation, the draft through the indirect passageway or radiator will remain substantially constant. As will be noted, the main valve or damper will be limited in its inward movement by engagement with the stop 85 on the rod 53$^a$.

This last described modification of the invention, aside from the by-pass control, constitutes an efficient and highly satisfactory form of draft regulator in that beyond that stage in its operation where the upper edge of the damper on valve 57$^a$ is adjacent the inner edge of the deflector or baffle 86, it insures a substantially constant draft through the combustion apparatus. It is to be understood, therefore, that, especially with respect to the form of the invention last described, our invention in its broader aspect has reference to the draft regulator per se.

Having thus described our invention, what we claim is:

1. In a furnace having a direct and an indirect passageway for conducting the products of combustion from the combustion chamber to the flue, each communicating with the combustion chamber independently of the other, means for regulating the flow of the products through said passageways, and further means responsive to the draft pressure of the flue for operating the former means and for admitting atmospheric air to the flue.

2. In a furnace having a direct and an indirect passageway for conducting the products of combustion from the combustion chamber to the flue, each communicating with the combustion chamber independently of the other, means operative to determine whether the products shall pass through the direct or the indirect passageway, and further means responsive to the flue draft pressure for operating the former means and for admitting atmospheric air to the flue.

3. In a furnace having a direct and an indirect passageway for conducting the products of combustion from the combustion chamber to the flue, each communicating with the combustion chamber independently of the other, means for by-passing the products directly from said chamber to the flue, and further means responsive to draft pressure in the flue for rendering the former means ineffective and for admitting atmospheric air to the flue.

4. In a furnace having a direct and an indirect passageway for conducting the products of combustion from the combustion chamber to the flue, each communicating with the combustion chamber independently of the other, a valve governing the direct passageway, a second valve controlling the admission of atmospheric air to the flue, the latter valve being biased toward closed position and opening in response to the flue draft pressure, and lost-motion connections between the valves whereby the first mentioned one is caused to close when the second one partially opens.

5. In a furnace having a direct and an indirect pasageway for conducting the products of combustion from the combustion chamber to the flue, a valve governing the direct passageway, and means responsive to draft pressure in the flue for controlling the opening and closing of said valve and for admitting atmospheric air to the flue.

6. In a furnace having a direct and an indirect passageway for conducting the products of combustion from the combustion chamber to the flue, a normally open valve governing the direct passageway, and means responsive to draft pressure in the flue for effecting the closing of said valve and for admitting atmospheric air to the flue.

7. In a furnace having a direct and an indirect passageway for conducting the products of combustion from the combustion chamber to the flue, a valve governing the direct passageway, means tending to close said valve, a second valve controlling the admission of atmospheric air to the flue and opening in response to the flue draft pressure, means tending to maintain the second valve closed and being superior in force to that tending to close the first mentioned valve, and connections between the valves whereby the first mentioned one is maintained open when the second mentioned one is closed.

8. In a furnace having a direct and an indirect passageway for conducting the products of combustion from the combustion chamber to the flue, a valve governing the direct passageway, a weight tending to close said valve, a second valve controlling the admission of atmospheric air to the flue and opening in response to the flue draft pressure, a weight tending to maintain the second valve closed, the second mentioned weight exerting an influence upon the valve wherewith it is associated that is superior to the influence of the first mentioned weight upon the valve which it controls, and connections between the valves whereby the first mentioned one is held open when the second one is closed.

9. In combination with a furnace having a direct and an indirect passageway for conducting the products of combustion from the combustion chamber to the flue, a valve governing the direct passageway, a second valve controlling the admission of atmospheric air to the flue and opening in response to the flue draft pressure, means tending to maintain said second valve closed, and lost-motion connections between the valves permitting a differential movement between the two whereby the first mentioned valve is held open when the second mentioned valve is closed and which permits movement of the second mentioned valve in excess of that required to allow the first mentioned valve to close.

10. A draft regulator for use with furnaces having a direct and an indirect passageway for the egress of the products of combustion from the combustion chamber, said draft regulator comprising a casing into which said passageways open independently of each other and through which they communicate with the flue, said casing having an opening for the admission of atmospheric air, a shutter for said opening that opens inwardly of the casing in response to the flue draft pressure, a damper movably supported in the casing for controlling the direct passageway, said damper being biased toward closed position, and operative connections between the shutter and damper whereby the latter is held open when the shutter is closed.

11. A draft regulator for use with furnaces having a direct and an indirect passageway for the egress of the products of combustion from the combustion chamber, said draft regulator comprising a casing into which said passageways open independently of each other and through which they communicate with the flue, said casing having an opening for the admission of atmospheric air, a gravity-closed shutter for closing said opening that opens in response to the flue draft pressure, a gravity-closed valve within the casing for controlling the passage of the products through the direct passageway, and lost-motion connections between said valve and the shutter permitting a differential movement between the two whereby the valve is held open when the shutter is closed and the shutter is permitted to open a distance in excess of that required to allow the valve to close.

12. A draft regulator for use with furnaces having a direct and an indirect passageway for the egress of the products of combustion from the combustion chamber, said draft regulator comprising a casing into which said passageways open independently of each other and through which they communicate with the flue, and a unit removably connected to the casing and incorporating valves for controlling the direct passageway and for governing the admission of atmospheric air to the casing, and differential connections between the valves whereby the first mentioned valve is caused to open when the second mentioned valve closes and the second mentioned valve is permitted to open in excess of that required to permit the first mentioned valve to close.

13. A draft regulator for use with furnaces having a direct and an indirect passageway for the egress of the products of combustion from the combustion chamber, said draft regulator comprising an open-sided casing arranged for communication with a flue and into which the aforesaid passageways open in opposed relation to the open side of the casing, a frame detachably connected to the open side of the casing and through the opening of which atmospheric air is admitted to the casing, a support extending inwardly from the top of said frame, a damper suspended therefrom for controlling the direct passageway, a shutter pivotally supported adjacent the top of the frame for closing the opening thereof, and operative connections between the shutter and damper.

14. A draft regulator for use with furnaces of the class having a direct and an indirect passageway for the egress of the products of combustion from the combustion chamber, said draft regulator comprising a casing arranged for communication with the flue and into which the aforesaid passageways open in opposed relation to the open side of the casing, a frame detachably connected to the open side of the casing and through the opening of which atmospheric air is admitted to the casing, a support extending inwardly from the top of said frame, a damper suspended therefrom in operative relation to the direct passageway, a weighted arm projecting from the damper toward the aforesaid frame, a shaft supported for oscillation by the frame and extending transversely across the upper side thereof, said shaft incorporating an arm extending laterally in a direction away from the frame, a shutter fastened to the shaft for closing the opening of the frame, a weight on the aforesaid arm for urging the shutter toward closed position, and lost-motion connections between the shutter and the aforesaid weighted arm that is carried by the damper and through the medium of which connections the damper is held open when the shutter is closed.

15. A draft regulator for use with furnaces of the class having a direct and an indirect passageway for the egress of the products of combustion from the combustion chamber, said draft regulator comprising an open-sided casing arranged for communication with the flue and into which the aforesaid passageways open in opposed relation to the open side of the casing, a frame detachably connected to the open side of the casing and through the opening of which atmospheric air is admitted to the casing, a bracket extending inwardly from each side of the frame adjacent the top thereof, a bar connecting the inner ends of the bracket, a U-shaped member carried by said bar, a shaft having its ends engaged within apertures in the opposed branches of said members, a metallic strap having one of its ends curled about said shaft, the shaft being kinked on opposite sides thereof, a damper supported by the lower end of said strap in operative relation to the direct passageway, a weighted arm projecting from the damper toward the aforesaid frame, a shaft extending transversely across the top of the frame and supported thereby for oscillation, a shutter connected to said shaft for controlling the admission of atmospheric air through the opening of the frame, one end of the shaft extending beyond the casing and incorporating an arm that extends laterally from the shaft in a direction away from said frame, a weight on said arm, and lost-motion connections between the shutter and the aforesaid weighted arm on the damper.

16. A draft regulator for use with furnaces of the class having a direct and an indirect passageway for the egress of the products of combustion from the combustion chamber, said draft regulator comprising an open-sided casing arranged for communication with the flue and into which the aforesaid passageways open in opposed relation to the open side of the casing, a frame detachably connected to the open side of the casing and through the opening of which atmospheric air is admitted to the casing, a bracket extending inwardly from each side of the frame adjacent the top thereof, a bar connecting the inner ends of the bracket, an elongated member depending from said bar, a damper movably supported thereby in operative relation to the direct passageway, a weighted arm projecting from the damper toward the aforesaid frame, a shaft extending transversely across the top of the frame and supported thereby for oscillation, a shutter having sleeve-like portions that surround the shaft at points spaced longitudinally thereof, the portion of said shaft between said sleeve-like portions of the shutter being offset laterally from the axis of the shaft, a clip binding the offset portion of the shaft to the shutter, one end of the shaft extending beyond the casing and incorporating an arm that extends laterally from the shaft in a direction away from said frame, a weight on said arm, and lost-motion connections between the shutter and the aforesaid weighted arm on the damper.

17. A draft regulator comprising a casing having a flue opening in its top and an air admitting opening in one of its side walls, the opposite side wall of the casing being provided with openings for communication with direct and indirect passageways of a combustion apparatus, a damper hingedly supported adjacent the bottom of the air admitting opening, said damper being biased toward closed position, a damper suspended within the casing for controlling the direct passageway, and operative connections between said dampers whereby the second mentioned damper is held open when the first mentioned damper is closed and which permits the second damper to close as said first mentioned damper swings toward open position.

18. A draft regulator comprising a casing having four openings, one for connection with a flue, two for connection with a combustion apparatus through direct and indirect passageways, respectively, and a fourth for the admission of atmospheric air, a damper hinged adjacent one side of the last mentioned opening and serving as it swings toward open position to reduce the area of the passageway provided by said casing between the first mentioned opening and the one communicating with the indirect passageway, a damper for controlling the direct passageway, and operative connections between the dampers whereby the second one opens when the first closes, and vice versa.

19. In a furnace having a direct and an indirect passageway for conducting the products of combustion from the combustion chamber to the flue, selective means responsive to draft pressure in the flue for positively shunting all of the products through one of the passageways and capable of modifying the draft therethrough by the admission of atmospheric air in variable quantity to the flue.

LEE S. CHADWICK.
JOHN ALGER DAHLSTROM.